US012596175B2

(12) United States Patent
Koblick

(10) Patent No.: US 12,596,175 B2
(45) Date of Patent: Apr. 7, 2026

(54) NON-RESOLVED TARGET DETECTION SYSTEM AND METHODS

(71) Applicant: Raytheon Company, Arlington, VA (US)

(72) Inventor: Darin C. Koblick, El Segundo, CA (US)

(73) Assignee: Raytheon Company, Arlington, VA (US)

( * ) Notice: Subject to any disclaimer, the term of this patent is extended or adjusted under 35 U.S.C. 154(b) by 504 days.

(21) Appl. No.: 17/977,151

(22) Filed: Oct. 31, 2022

(65) Prior Publication Data

US 2024/0402294 A1     Dec. 5, 2024

(51) Int. Cl.
G01S 7/40      (2006.01)
G01S 7/02      (2006.01)
G06N 10/20     (2022.01)

(52) U.S. Cl.
CPC ............ G01S 7/4039 (2021.05); G01S 7/021 (2013.01); G06N 10/20 (2022.01)

(58) Field of Classification Search
CPC ........ G01S 7/4039; G01S 7/021; G06N 10/20
See application file for complete search history.

(56) References Cited

U.S. PATENT DOCUMENTS

| | | | | |
|---|---|---|---|---|
| 12,242,929 | B2 * | 3/2025 | Malas | G06N 7/01 |
| 2024/0119550 | A1 * | 4/2024 | Stockert | G06N 10/20 |

OTHER PUBLICATIONS

Barrere, Chip; The Matched Filter—A Quick Analysis and Example, Radix2 [online] [retrieved on Mar. 3, 2025. Available online Jun. 24, 2022] (Year: 2022).*
Koretsky et al; A Tutorial on Electro-Optical/Infrared (EO/IR) Theory and Systems, Institute for Defense Analyses [online], p. 16 [retrieved Mar. 3, 2025. Available online Jan. 2013] (Year: 2013).*

* cited by examiner

*Primary Examiner* — William Kelleher
*Assistant Examiner* — Isabella Ameyali Edrada
(74) *Attorney, Agent, or Firm* — Schwegman Lundberg & Woessner, P.A.

(57)          ABSTRACT

Systems and methods are provided for modeling non-resolved object detection performance of sensor systems. An exemplary method includes: receiving a first data from or associated with a plurality of sensors; creating, using the first data, a plurality of models for each of the sensors; calculating, using the models and the first data, signal-to-ratio (SNR) values for the sensors against a target; creating, using the SNR values, a plurality of probability of detection models for each of the sensors, wherein one of the probability of detection models is a quantum illumination probability of detection model; and determining, using the detection models, non-resolved target detection performance of each of the sensors.

18 Claims, 7 Drawing Sheets

RECEIVE A FIRST DATA FROM OR ASSOCIATED WITH A PLURALITY OF SENSORS — 702

CREATE A PLURALITY OF MODELS FOR EACH OF THE SENSORS — 704

CALCULATE SIGNAL-TO-RATIO (SNR) VALUES FOR THE SENSORS AGAINST A TARGET — 706

CREATE A PLURALITY OF PROBABILITY OF DETECTION MODELS FOR EACH OF THE SENSORS — 708

DETERMINE A NON-RESOLVED TARGET DETECTION PERFORMANCE OF EACH OF THE SENSORS — 710

700

NON-RESOLVED TARGET DETECTION SYSTEM AND METHODS

BACKGROUND

The trajectory or flight path of objects traveling through space are affected by the gravitational fields of massive objects or planetary bodies such as the Earth, Moon, and the Sun also referred to as primary bodies. Many man-made objects such as satellites, spacecraft, and space debris are orbiting the Earth, its moon, and other primaries such as Mars and Jupiter. Techniques for accurately predicting the trajectory of satellites, including those in cislunar orbits, are desirable to avoid conjunctions. Existing trajectory estimation techniques involve prediction models based on the underlying physics of the environment. These estimation techniques require obtaining a sensor performance modeling library which can account for Electro-Optical and Infrared (EOIR), RADAR, and Quantum RADAR Sensors. Moreover, sensor performance modeling is needed to estimate the object tracking performance of a Kalman filter when assessing track quality of an architecture, or force mix, against a ground-based, air-based, space-based target requiring millions of measurements from different sensor platforms at high measurement rates (up to 100 Hz in some missile tracking cases). Furthermore, these techniques involve user interfaces and user information to adequately understand predicted trajectories in a timely manner.

Hence, there is a need to rapidly model the non-resolved object detection performance of EOIR, RADAR, and Quantum RADAR sensor systems against a range of targets in different environments (air, space, near Earth, cislunar).

SUMMARY

According to one aspect of the disclosure, a system for modeling non-resolved object detection performance of sensor systems is provided. The system includes one or more computing device processors, and one or more computing device memories. The one or more computing device memories are coupled to the one or more computing device processors. The one or more computing device memories storing instructions executed by the one or more computing device processors. The instructions are configured to: receive a first data from or associated with a plurality of sensors; create, using the first data, a plurality of models for each of the sensors; calculate, using the models and the first data, signal-to-ratio (SNR) values for the sensors against a target; create, using the SNR values, a plurality of probability of detection models for each of the sensors, wherein one of the probability of detection models is a quantum illumination probability of detection model; and determine, using the detection models, non-resolved target detection performance of each of the sensors.

According to another aspect of the disclosure, a method for modeling non-resolved object detection performance of sensor systems is provided. The method includes: receiving a first data from or associated with a plurality of sensors; creating, using the first data, a plurality of models for each of the sensors; calculating, using the models and the first data, signal-to-ratio (SNR) values for the sensors against a target; creating, using the SNR values, a plurality of probability of detection models for each of the sensors, wherein one of the probability of detection models is a quantum illumination probability of detection model; and determining, using the detection models, non-resolved target detection performance of each of the sensors.

According to another aspect of the disclosure, a non-transitory computer-readable storage medium storing instructions which when executed by a computer cause the computer to perform a method for modeling non-resolved object detection performance of sensor systems is provided. The method includes the following: receiving a first data from or associated with a plurality of sensors; creating, using the first data, a plurality of models for each of the sensors; calculating, using the models and the first data, signal-to-ratio (SNR) values for the sensors against a target; creating, using the SNR values, a plurality of probability of detection models for each of the sensors, wherein one of the probability of detection models is a quantum illumination probability of detection model; and determining, using the detection models, non-resolved target detection performance of each of the sensors.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
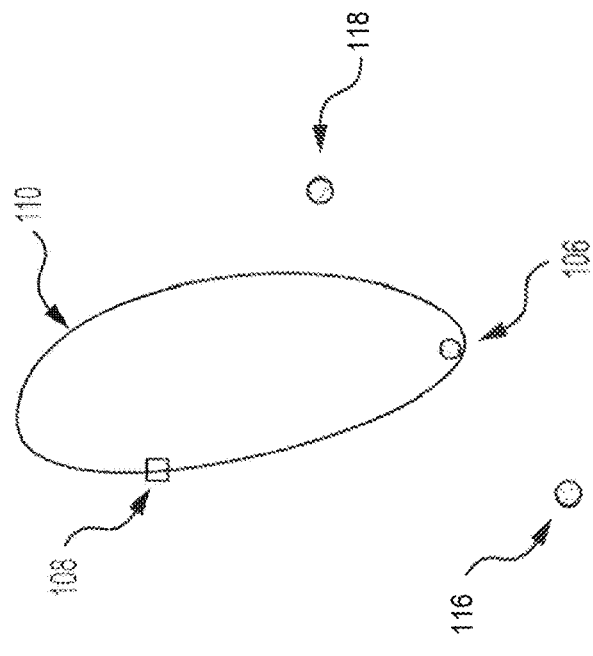
FIG. 1 is a diagram shows a solar system view including the Sun, Earth, and Moon where an object is in a Near Rectilinear Halo Orbit (NRHO) with respect to the barycentric frame of reference, in accordance with some embodiments.
Figure 1:
Figure 1:
Figure 1:
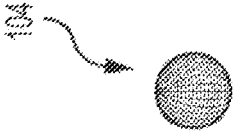
Figure 1:
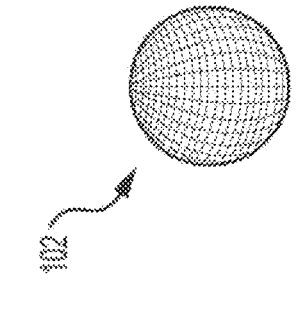
Figure 1:
Figure 1:

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes a non-resolved object detection and performance system and methods for rapidly modeling the non-resolved object detection performance of RADAR, Electro-Optical and Infrared (EOIR), and Quantum RADAR sensor systems against a range of targets which include: subsonic, supersonic, hypersonic missiles, satellites, space debris, planets, stars, or the like. The non-resolved object detection and performance system may support ground, airborne, and space-based RADAR/EOIR/Quantum sensor systems and includes a radiometric sensor model which incorporates physics-based interactions between the sensor and target. This package is designed to work with a library that models the track quality of EO/IR, RADAR, and Quantum sensors.

FIG. 1 is a diagram showing a solar system view 100 including the Sun 102, Earth 104, and Moon 106 where an object 108, e.g., a spacecraft, is in cislunar orbit along a trajectory and/or flight path 110 with respect to the Moon 106. View 100 also shows satellites 112 and 114 in orbit around the Earth 104. Such satellites 112 and 114 may include target and/or object tracking sensors such as at least one of an EOIR sensor, RADAR sensor, and quantum RADAR sensor. One or more sensors may be located on the surface of the Earth 104 and/or Moon 106. One or more sensors may be located in space such as at Lagrange point 116, e.g., $L_1$ and/or at Lagrange point 118, e.g., $L_2$. Lagrange points are positions in space where objects can remain stationary because the gravitational fields of the primary bodies 102, 104, and 106 substantially compensate for each and/or cancel each other out.

Figure 2:
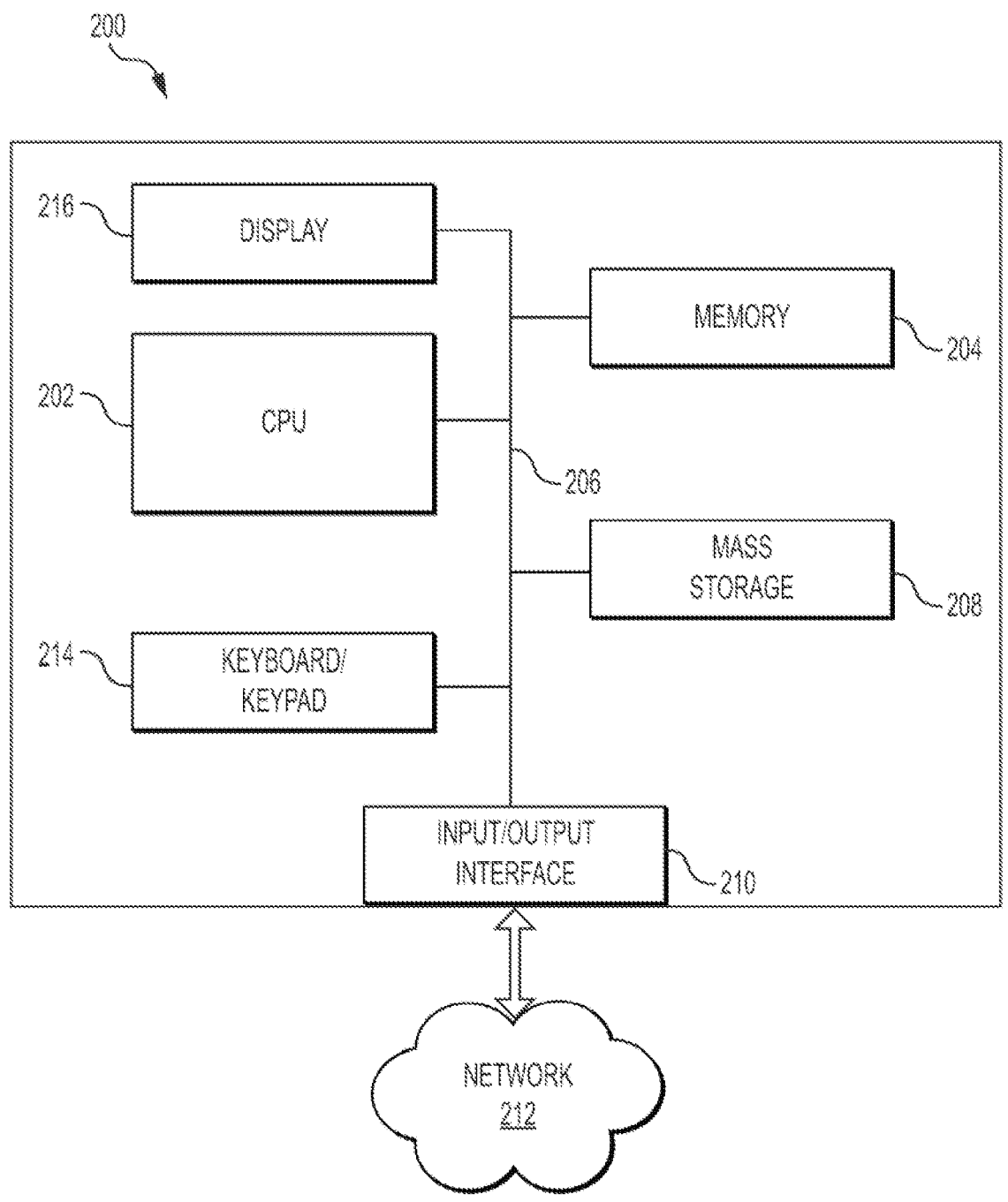
FIG. 2 is a schematic diagram of a computer system arranged to perform function associated with an interactive object trajectory prediction system, in accordance with some embodiments.
Figure 3:
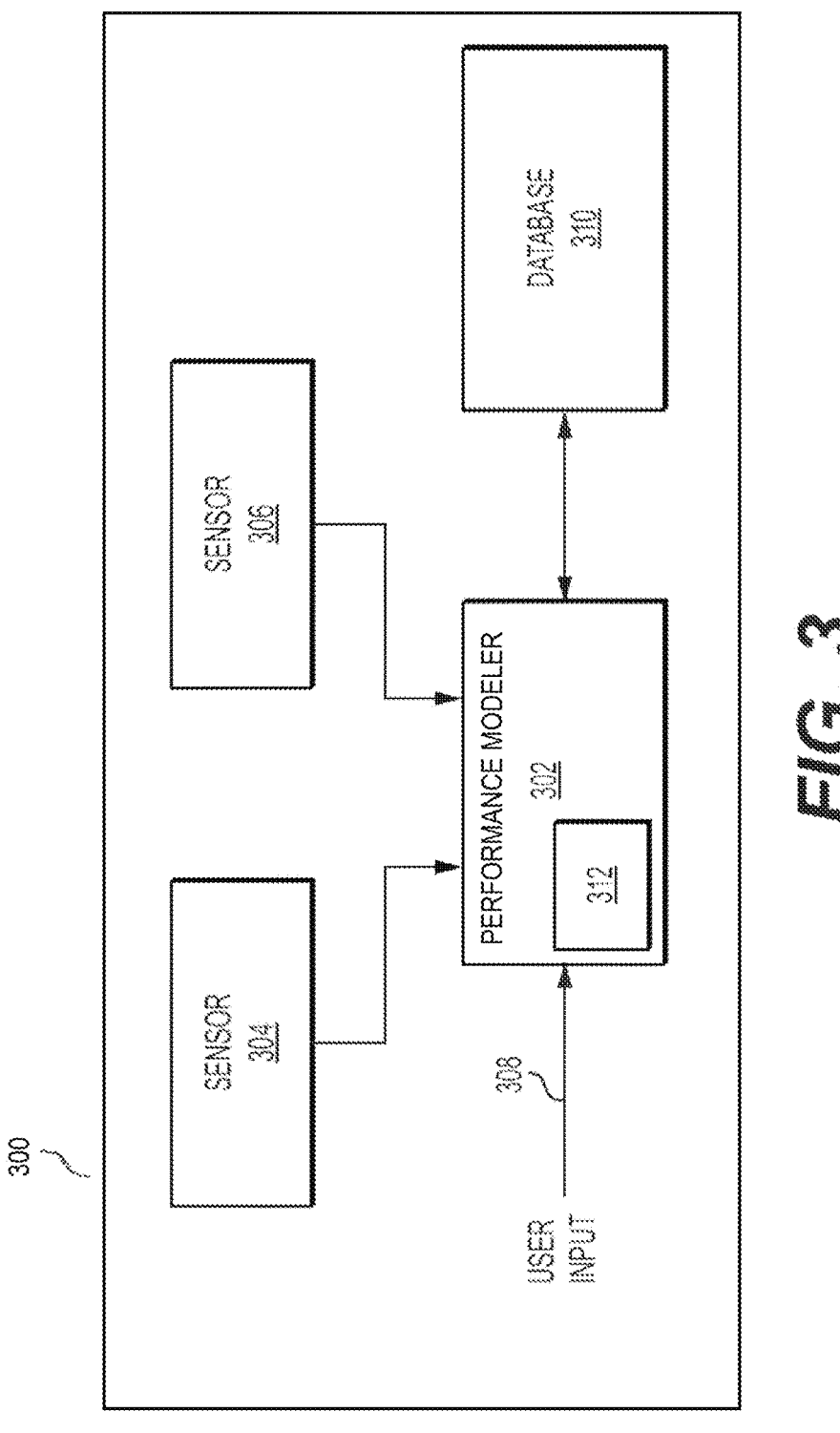
FIG. 3 is a block diagram of an interactive object trajectory prediction system, in accordance with some embodiments.

FIG. 2 shows a diagram of a computer system arranged to perform function associated with an interactive object trajectory prediction system, including functions associated with system 300 and/or processor 302 of FIG. 3. The computer system 200 may be implemented as a virtual machine or a physical machine. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random-access memory (DRAM) and high-speed cache memory. In operation, memory 204 stores at least portions of instructions and data for execution by the CPU 202. The memory 204 may also contain computing elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid-state memories, for storing data and instructions for use by the CPU 202. At least one component of the mass storage system 208, preferably in the form of a non-volatile disk drive, solid state, or tape drive, stores a database used for processing data and controlling functions associated with receiving user inputs and/or display data associated with an object trajectory prediction system such as system 300. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a processor according to FIG. 3, the data interface 210 may provide a relatively high-speed link to a network 212, such as an intranet, internet, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed object trajectory prediction operations. Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216, computer mouse, and keyboard 214 or the like serving as a local user interface for programming and/or data retrieval purposes. A mouse may enable a user to position a pointer over a selectable icon and/or button on display 216 to enable the user to make selections and/or configure an object trajectory prediction system to implement a tracking model and/or display selected graphical or other data associated with tracking an object. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include an object trajectory prediction system according to FIG. 3. The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as system 300. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, MATALB, Javascript, Java, CSS, Python, Keras, TensorFlow, PHP, Ruby, C++, C, Shell, C #, Objective-C, Go, R, TeX, VimL, Perl, Scala, CoffeeScript, Emacs Lisp, Swift, Fortran, Visual BASIC, HDL, VHDL, and/or one or more versions of Verilog. Certain script-based programs may be employed such as XML, WML, PHP, and so on. The system 200 may use a digital signal processor (DSP).

As stated previously, the mass storage 208 may include a database. The database may be any suitable database system, including the commercially available or open-source products, such as, but not limited to, Microsoft Access, Sybase, SQL Server, MongoDB, SqlLite. The database can be implemented as a local or distributed database system. The database may be supported by any suitable persistent data memory, such as a hard disk drive, RAID system, tape drive system, floppy diskette, or any other suitable system. The system 200 may include a database that is integrated with the system 100 or 300, however, it will be understood that, in other implementations, the database and mass storage 208 can be an external element. The database may include object trajectory and/or flight path files, filter modules, sensor modules, and one or more flight path models and/or algorithms associated with system 300.

In certain implementations, the system 200 may include an Internet browser program and/or be configured to operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 200 and/or 300 includes a networked-based, e.g., Internet-based, application that may be configured and run on any combination of the other components of system 200 and/or 300. The computer system 200 may include a web server running a Web 2.0 application or the like. Web applications running on system 100 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 200 and/or 300 may include applications that employ Verilog HDL, VHDL, asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 300 and/or computer system 200 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

FIG. 3 shows a block diagram of an interactive non-resolved object detection and performance system 300 including an interactive performance modeler 302, sensors 304 and 306, database 310, and user interface 312. Performance modeler 302 may receive sensor data from one or more sensors such as sensor 304 and 306 in real-time or at any time. Sensor data including, for example, operational properties of sensors 304 and 306, may be processed in real-time by a processor, e.g. computer system 200 of FIG. 2, of performance modeler 302 or processed at a later time by performance modeler 302. Database 310 may include, for example, a database associated with mass storage 208 and/or memory 204, as described with respect to FIG. 2. Database 310 may store, without limitation, orbit type data, orbit family data, hemispheres data of one or more primary bodies, sensor module data, sensor module type data, tracking quality of sensors data, sensor module configuration data, target and/or object trajectory data and/or files, tracking models such as a Circular Restricted Three Body (CR3B) model, model filter configuration data, track quality data, track quality post processing data, spectral quantum efficiency data, spectral transmissivity data, viewing Point Source Transmission (PST) data, primary body exclusion angles data, False Alarm Rate (FAR) data, sky background brightness configuration data, cloud clutter model configuration data, target-sensor SNR data, target-sensor detectability data and/or probably detection (Pd) data, constraints data, or the like.

User interface 312 may receive user inputs, selections, and/or configuration instructions 308 from a user while configuring performance modeler 302 to model the non-resolved object detection and performance of sensor of sensors 304 and/or 306. User interface 312 may include a display such as display 216 arranged to display information to a user such as shown in FIGS. 4-7 and/or receive user inputs via, for example, a touch screen, mouse pointer, and/or keyboard 214. Sensors 304 and/or 306 may be positioned on a satellite, ground station, or vehicle on the surface of a primary body or in space. A sensor may include an EOIR sensor, RADAR sensor, and/or a quantum RADAR sensor.

Performance modeler 302 may include a processor, such as system 200 and/or CPU 202, arranged to simultaneously display on a display 216 the various models it uses to perform its operations. Performance modeler 302 may include an input device of a user interface 312 arranged to receive a user selection 308 of a first sensor module of a plurality of sensor modules used to model non-resolve performance of sensors 304 and/or 306. The processor, in response to the user selection 308 of the first sensor module, may implement models for modeling the non-resolved object detection and performance of the first sensor module.

Performance modeler 302 may include a data interface such as interface 210 that is arranged to receive data from one or more object position sensors such as sensors 304 and 306. The processor of performance modeler 302 may then model the non-resolve detection and performance based in part on the object position data and/or a selected sensor module. The one or more object position sensors 304 and 306 may be located on the primary body that the object is orbiting, on another primary body, or in space. The displayed reference frame may display the locations of the one or more position sensors 304 and/or 306.

The processor, e.g., system 200 and/or CPU 202, may be arranged to simultaneously display on the display 216 object SNR from at least one of the one or more position sensors 304 and/or 306. The first sensor module may include an electro optical/infrared (EOIR) module, a RADAR module, and/or a quantum RADAR module. The modules may be stored in database 310. The primary body may be the Moon, Earth, Mars, another moon, and/or another planet. The non-resolved object detection and performance system 300 may include a cislunar orbit prediction system. The surface of the primary body may be displayed in a two-dimensional and/or three-dimensional format. The object may include a spacecraft, satellite, space debris, a star, a planet, a meteor, a comet, ballistic missile, subsonic missile, supersonic missile, hypersonic missile, or cruise missile.

A modeled non-resolved object detection and performance of a target may be output by performance modeler 302 to a guidance system of a vehicle such as a spacecraft or satellite to enable the vehicle to avoid a collision with the target or enable intercept for docking or inspection. Performance modeler 302 may output a model of the non-resolved object detection and performance of a target to a guidance system of a missile or fire control system of, for example, a laser system, to enable intercept and/or neutralization of the target.

Figure 4:
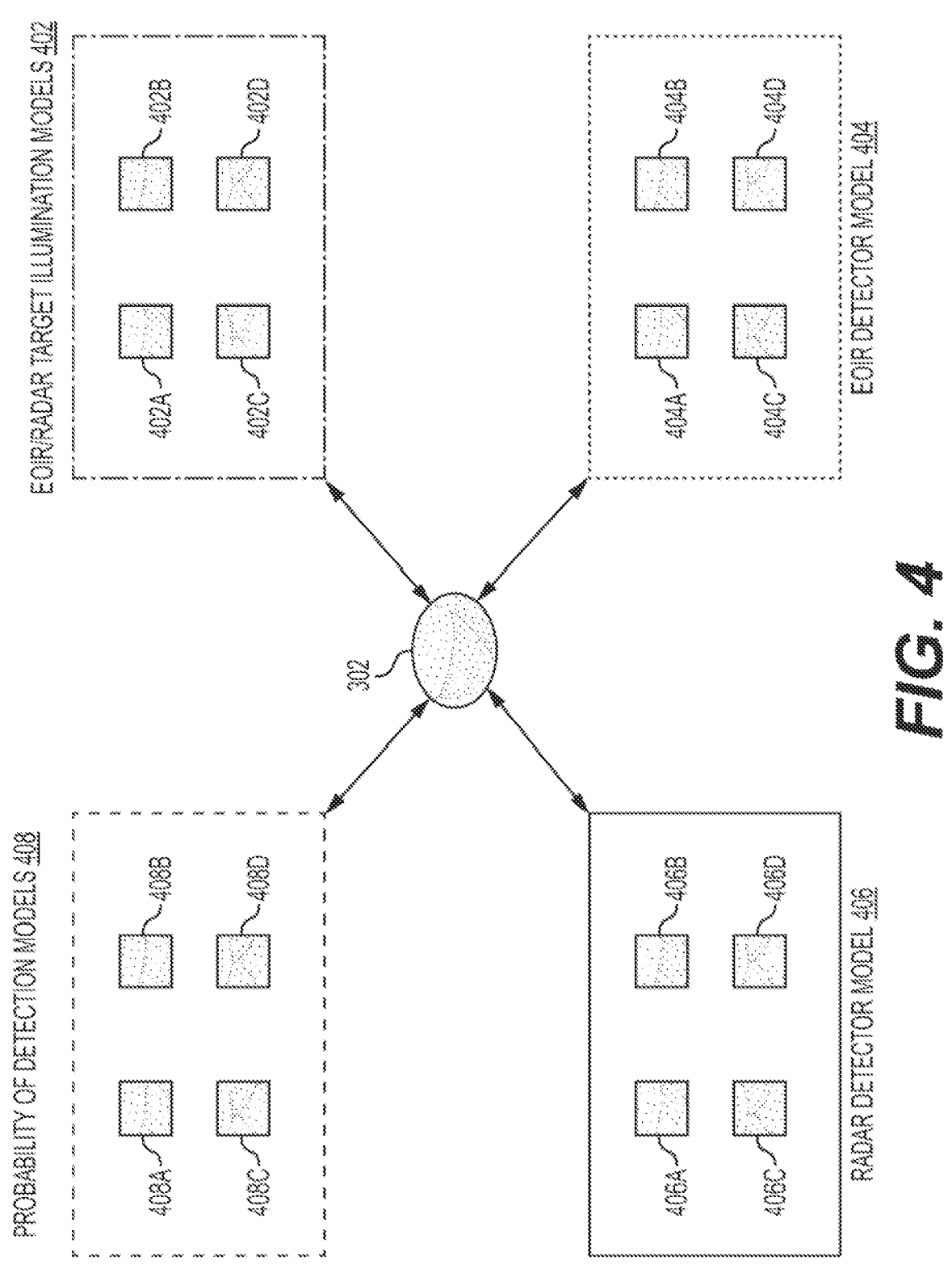
FIG. 4 is a block diagram of models used by the non-resolved object detection and performance system, in accordance with some embodiment.

FIG. 4 is a block diagram of models used by performance modeler 302, in accordance with some embodiment. The performance modeler 302 of non-resolved object detection and performance system 300 utilizes various models 402, 404, 406, and 408. to evaluate the non-resolved object detection and performance of a RADAR, EOIR, and quantum RADAR sensor systems against a range of targets which include: subsonic, supersonic, hypersonic missiles, satellites, space debris, planets, stars, or the like. In particular, the performance modeler 302 utilizes EOIR/Radar Target Illumination Models 402 to model the illumination for the range of targets used. The EOIR/RADAR Target Illumination Models 402 includes several illumination models 402A-402D.

Model 402A is associated with modeling a RADAR Cross Section (RCS) of a perfectly conducting sphere, commonly used to represent a target. Model 402B is associated with modeling solar illumination used to calculate the intensity of light from the sun that is reflected from the target. Model 402C is associated with a black body radiation model used in computing exoatmospheric solar irradiance near Earth across the electromagnetic spectrum. Model 402D is associated with modeling planet shine illumination of a target. Planet shine occurs when the sun shines on the planet and is reflected toward the target. Sensors may see increased brightness due to the sun's reflection on the planet reflecting off the target.

The performance modeler 302 utilizes EOIR Detector Model 404 to model detecting a range of targets used using a EOIR sensor model. EOIR Detector Model 404 includes a number of models 404A-404D to determine the SNR for an EOIR sensor. Model 404A is directed to modeling cloud clutter. For space-based sensors looking at airborne targets, background clutter from clouds can cause false alarms. Fortunately, model 404A may use Miniature Sensor Technology Integration 3 (MSTI-3) data as it has characterized the sensor noise induced from cloud clutter for both Short Wave Infrared (SWIR) and Medium Wave Infrared (MWIR) wavebands. Model 404A may extend to other datasets/wavebands, and interpolates between models for different wavebands.

In particular, the SWIR wavebands utilize an algorithm requiring estimating the SWIR 1-$\sigma$-background clutter and SWIR mean sky background spectral irradiance values from the spectral radiance function, the solar scattering angle ($\theta_{SSA}$), the sensor instantaneous field of view ($\theta_{IFOV}$), and the bandwidth of the sensor ($\Delta\lambda$), as follows $$E_{\mu SWIR}(\lambda) = \pi\sin^2(\theta_{IFOV}/2) \cdot L_{SWIR}(C_{Q,\mu}, g_{Q,\mu}, \theta_{SSA}, \Delta\lambda) \qquad (1)$$

$$E_{\mu SWIR}(\lambda) = \pi\sin^2(\theta_{IFOV}/2) \cdot L_{SWIR}(C_{Q,\sigma}, g_{Q,\sigma}, \theta_{SSA}, \Delta\lambda) \qquad (2)$$

where $L_{SWIR}(C, g, \theta, \Delta\lambda)$ represents the radiance function for the SWIR waveband and described as $$L_{SWIR}(C, g, \theta, \Delta\lambda) = \Delta\lambda \cdot \frac{C}{20.72 \cdot (1 + g^2 - 2g\cos\theta)^{\left(\frac{3}{2}\right)}} \qquad (3)$$

Similar to the SWIR irradiance algorithm, the irradiance estimates for MWIR are computed from a different spectral radiance function dependent upon, zenith angle ($\theta_{ZA}$), the sensor instantaneous field of view ($\theta_{IFOV}$), and the bandwidth of the sensor ($\Delta\lambda$) such that $$E_{\mu MWIR}(\lambda) = \pi\sin^2(\theta_{IFOV}/2) \cdot L_{MWIR}(C_{Q,\mu}, g_{Q,\mu}, \theta_{ZA}, \Delta\lambda) \qquad (4)$$

$$E_{\mu MWIR}(\lambda) = \pi\sin^2(\theta_{IFOV}/2) \cdot L_{MWIR}(C_{Q,\sigma}, g_{Q,\sigma}, \theta_{ZA}, \Delta\lambda) \qquad (5)$$

where $L_{MWIR}(C, g, \theta, \Delta\lambda)$ represents the radiance function for the SWIR waveband and described as $$L_{MWIR}(C, g, \theta, \Delta\lambda) = \Delta\lambda \cdot \frac{C}{18 \cdot (1 + g \cdot \cos\theta)^{\left(\frac{3}{2}\right)}} \qquad (6)$$

Model 404B is directed to spatial matched filtering and velocity matched filtering. Spatial matched filters are used in high fidelity signal processing applications to improve the SNR. When searching for resident space objects (RSOs), or airborne targets, matched filters can achieve greater detection performance with a desired probability of false alarm, $P_{fa}$. In this case, a matched filter may be defined as a linear filter that collects the energy across multiple detector pixels into a single pixel and maximizes its SNR. A velocity matched filter applies a constraint in the form of assuming that targets may have a relative angular velocity over the integration period of the filter. Velocity filters may be applied over multiple frames, or single frames and able to improve the SNR similar to the spatial matched filter technique.

In particular, the spatial match filters used by model 404B are used to improve the SNR. When searching for resident space objects (RSOs), matched filters can achieve greater detection performance with a desired probability of false alarm ($P_{fa}$). An important parameter of an EOIR system is its Point Spread Function (PSF). The PSF is the output of the optical imaging system for an input point source. A two-dimensional symmetric Gaussian distribution is a good approximation of an optical PSF, while in practice, the PSF can vary from pixel to pixel and temporally.

In this case, the spatial matched filter is a linear filter that keeps the peak locations of a point source unchanged and maximizes its SNR. The peak SNR, from a point detector, is computed from the received intensity point on a single image frame at the center pixel location, $$SNR_0 = \frac{S}{\sigma_n} g_0(x_c, y_c) \qquad (7)$$

where S is the target signal after background subtraction, $\sigma_n$ is the localized standard deviation of the background noise, and $g_0(x_c, y_c)$ denotes the center pixel location of the image ($x_k=0$, $y_k=0$) where the signal should have a peak amplitude. In low density fields, an optimal spatial matched filter can be found that maximizes detectability by increasing the SNR. The SNR, after using a matched filter, can be computed as $$SNR_{MF} =$$

$$\frac{S\sum_{x_k=-\frac{N}{2}}^{\frac{N}{2}}\sum_{y=-\frac{N}{2}}^{\frac{N}{2}} g^2(x_c, y_c)}{\sigma_n\sqrt{\sum_{x_k=-\frac{N}{2}}^{\frac{N}{2}}\sum_{y=-\frac{N}{2}}^{\frac{N}{2}} g^2(x_c, y_c)}} = \frac{S}{\sigma_n}\sqrt{\sum_{x_k=-\frac{N}{2}}^{\frac{N}{2}}\sum_{y=-\frac{N}{2}}^{\frac{N}{2}} g^2(x_c, y_c)}, \qquad (8)$$

where N is the size of the processing window that this approach assumes that the optical PSF is exactly matched by the spatial matched filter PSF and g(xc, yc) is the unit amplitude square cell detector response. The SNR gain ratio (G) of the spatial matched filter is the ratio of the matched filter SNR over the peak SNR $$G = \frac{SNR_{MF}}{SNR_0} = \frac{1}{g_0(x_c, y_c)}\sqrt{\sum_{x_k=-\frac{N}{2}}^{\frac{N}{2}}\sum_{y=-\frac{N}{2}}^{\frac{N}{2}} g^2(x_c, y_c)} \qquad (9)$$

With regards to velocity matched filters, the center coordinates ($x_c=y_c=0$) may occur at the center of each detector element over a total number of elements defined by 1. The square cell detector response may be co-added to provide a streaking PSF with center coordinates following the direction of the streak, $$h(x_k, y_k) = \frac{\sum_{i=1}^{l} g(x_c, y_c)}{\sum_{x_k=-\frac{N}{2}}^{\frac{N}{2}}\sum_{y=-\frac{N}{2}}^{\frac{N}{2}}\left[\sum_{i=1}^{l} g(x_c, y_c)\right]} = \frac{1}{l}\sum_{i=1}^{l} g(x_c, y_c), \qquad (10)$$

where the relationship between the center detector coordinates and number of detector elements the streak may traverse, 1, may be found as a function of streak angle, $\theta$, such that $$[x_c, y_c] = [\cos\theta, \sin\theta] \cdot \begin{cases} \left(-\frac{l+1}{2} + i\right) \text{ for } i = [1, 2, \ldots l], \text{ if } l \text{ is odd} \\ \left(-\frac{l}{2} + i\right) \text{ for } i = [1, 2, \ldots l], \text{ if } l \text{ is odd} \end{cases} \qquad (11)$$

The SNR gain ratio (G) of a velocity matched filter is $$G = \frac{1}{h_0}\sqrt{\sum_{x_k=-\frac{N}{2}}^{\frac{N}{2}}\sum_{y=-\frac{N}{2}}^{\frac{N}{2}} h^2(x_k, y_k)} \qquad (12)$$

where $h_0$ denotes the center detector element location of the streak, $h_0=h(0, 0)$.

Model 404C is directed modeling to EOIR atmospheric attenuation to determine the loss of signal propagating through the atmosphere. In particular, detection model 404C employs LOWTRAN 7 to compute the total atmospheric transmittance with a spectral resolution preset to 25 $cm^{-1}$. Model 404D is directed to a model for imaging a target using an EOIR sensor with an optical point spread function (PSF). The optical PSF is the output image for an input point source. A two-dimensional symmetric Gaussian distribution is a good approximation for a PSF in an optical system. When the object is stationary with respect to the detector element, the PSF forms a symmetric gaussian spread only several pixels. When the object is moving across detector elements, the gaussian is elongated in the direction of its relative motion (e.g. streaking).

The performance modeler 302 utilizes a RADAR Detector Model 406 to estimate the detection performance against a variety of targets using a RADAR. RADAR Detector Model 406 includes a number of detection models 406A-406C. Model 406A is directed to a RADAR sensor model. The RADAR sensor model determines the SNR at the receiver input using the RADAR range equation. Model 406B is directed to the IF77 propagation model that predicts the atmospheric transmission loss between the RADAR frequency ranges of 125 MHz-20 GHz which covers most ground and space-based RADAR applications.

The IF77 Model is commonly used for aeronautical and satellite communication services, hence it computes the propagation parameters for ground-ground, ground-air, ground-satellite, air-air, and air-satellite links. Calculations also cover air-ground, space-ground, air-air, and space-air by reciprocity. The IF77 model computes atmospheric attenuation for platform and target altitudes up to 100 km. For those cases where either the sensor or target altitude is above the maximum altitude supported by IF77, a spherical Earth is used to capture the relative angle between the sensor and the target, the target altitude is then set to the maximum altitude supported by IF77 and the range between the sensor and the target is recomputed.

Model 406C is directed to modeling the phased array scan loss when a beam is steered away from the boresight of a phased array RADAR. Model 406D is directed to a quantum RADAR sensor model. The quantum RADAR sensor model uses an identical methodology for computing SNR as in model 406A. Note the main difference in the quantum RADAR model is in the probability of detection calculation where the quantum illumination Pd model is employed.

The performance modeler 302 computes a corresponding SNR for a RADAR, EOIR, and quantum RADAR sensor systems whose information is included in models 402-408. Using the corresponding SNR, performance modeler 302 may apply the corresponding SNR to one or more probability of detection models based on the type of sensor. Model 408A is directed to a single pulse probability of detection for nonfluctuating targets. In this case, model 408A uses the computed SNR of an EOIR sensor to produce the corresponding probability of detection model for nonfluctuating targets. An EOIR sensor may be designed to operate in the presence of background noise which can produce false alarms (e.g. detections when there is no signal). These background noise sources, described and computed in EOIR detector model 404, consist of receiver noise, stray light, shot noise, dark current, and thermal noise. In the absence of turbulence, it's assumed that both the noise and signal photo current statistics are adequately modeled by Gaussian statistics.

Model 408A is directed to a probability of detection for the optimal classic illumination protocol used in RADAR sensors. The RADAR sensor may include a coherent-state transmitter with homodyne detection. In this case, model 408A uses the computed SNR of a RADAR sensor to produce the corresponding probability of detection model for the optimal classic illumination protocol.

Model 408C is directed to the quantum illumination optimal receiver probability of detection. In this case, model 408C uses the computed SNR of a Quantum RADAR sensor to produce the corresponding Quantum illumination optimal receiver probability of detection. Note model 406D is used to calculate the SNR of a Quantum RADAR sensor.

Model 408D is directed to multiple pulse probability of detection for fluctuating targets.

Figure 5:
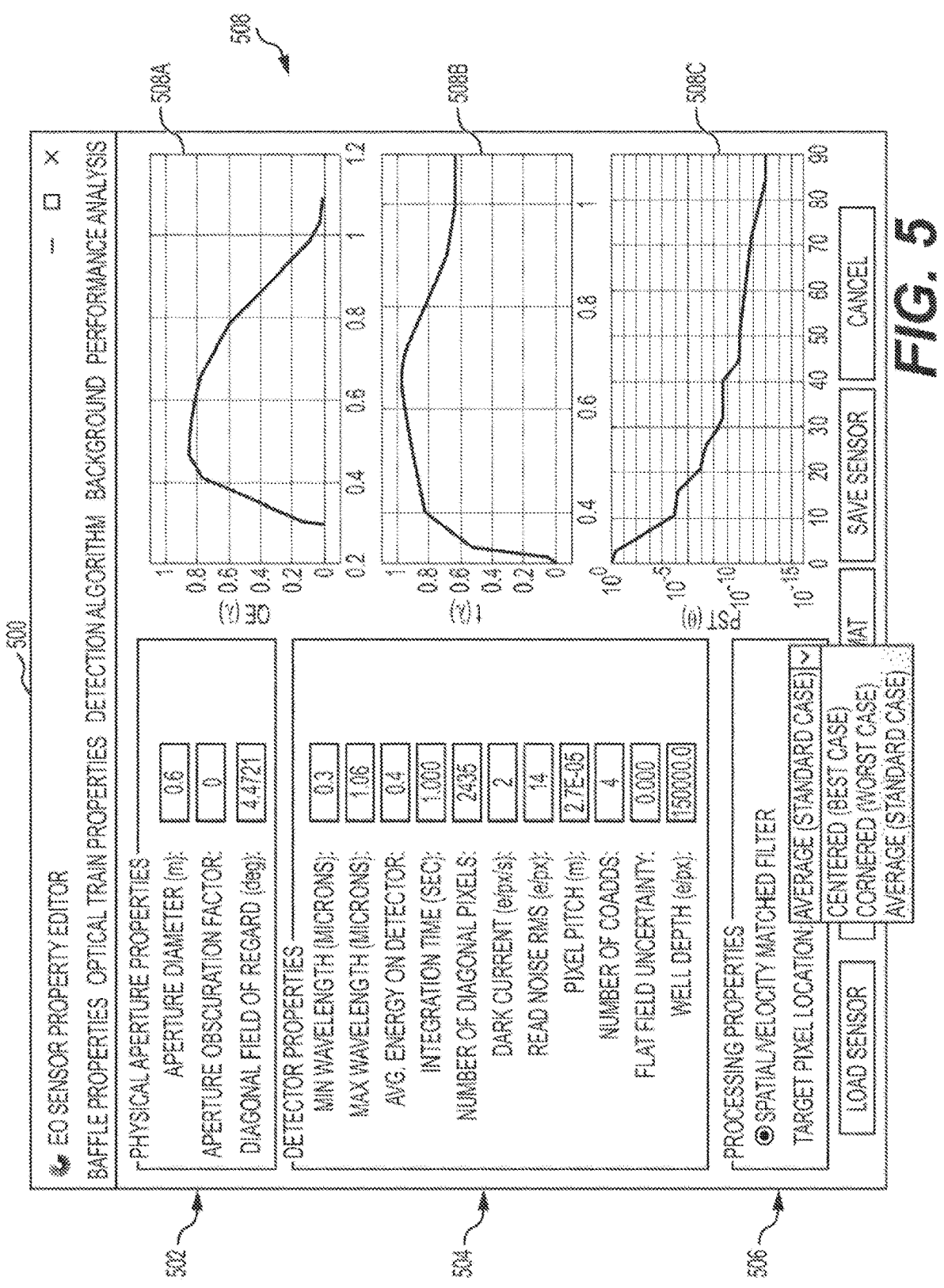
FIG. 5 is an example user interface for providing information regarding an EOIR sensor used by the non-resolved object detection and performance system, in accordance with some embodiments.

FIG. 5 is an example user interface 500 for providing information regarding an EOIR sensor used by performance modeler 302, in accordance with some embodiments. The user interface 500 includes a first region 502 having input fields arranged to enable a user to configure the physical aperture properties of the EOIR sensor. A second region 504 includes input fields to allow a user to configure the detector properties of the EOIR sensor. A third region 506 consists of an input button to enable a user to configure if the EOIR sensor uses spatial/velocity-matched filters and a drop-down menu to configure the EOIR sensor's target pixel location. The fourth region 508 includes several graphs, 508A-508C, indicative of the physical properties of the EOIR sensor based on the information provided.

In this case, graph 508A shows the quantum efficiency of the EOIR sensor. Graph 508B shows the optical transmissivity of the EOIR sensor. Graph 508C shows the point source transmissivity of the EOIR sensor.

Once the user is satisfied with information provided to example user interface 500, the data may be loaded to EOIR detector model 404. While FIG. 5 shows the case of one EOIR sensor, different EOIR sensor data may be loaded and processed by performance modeler 302.

Figure 6:
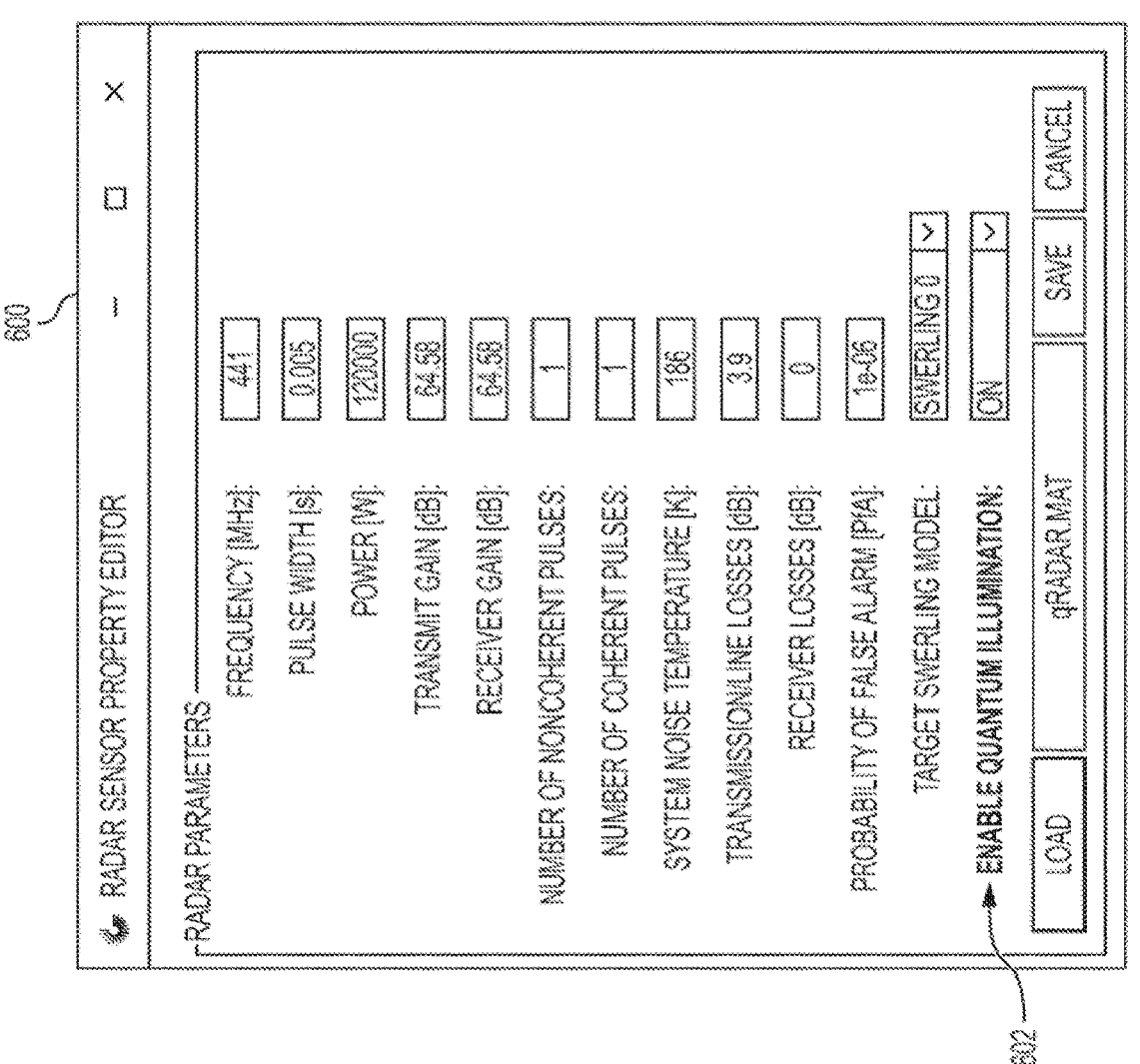
FIG. 6 is an example user interface for providing information regarding a RADAR sensor used by the non-resolved object detection and performance system, in accordance with some embodiments.

FIG. 6 is an example user interface 600 for providing information regarding a RADAR sensor used by performance modeler 302, in accordance with some embodiments. The user interface 600 includes a number of input fields and drop-down menus to allow a user to configure the properties of the RADAR sensor. One of these drop menus 602 allows a user to enable whether the RADAR sensor uses Quantum illumination.

Once the user is satisfied with information provided to example user interface 600, the data may be loaded to RADAR detector model 406. While FIG. 6 shows the case of one RADAR sensor, different RADAR sensor data may be loaded and processed by performance modeler 302.

Figure 7:
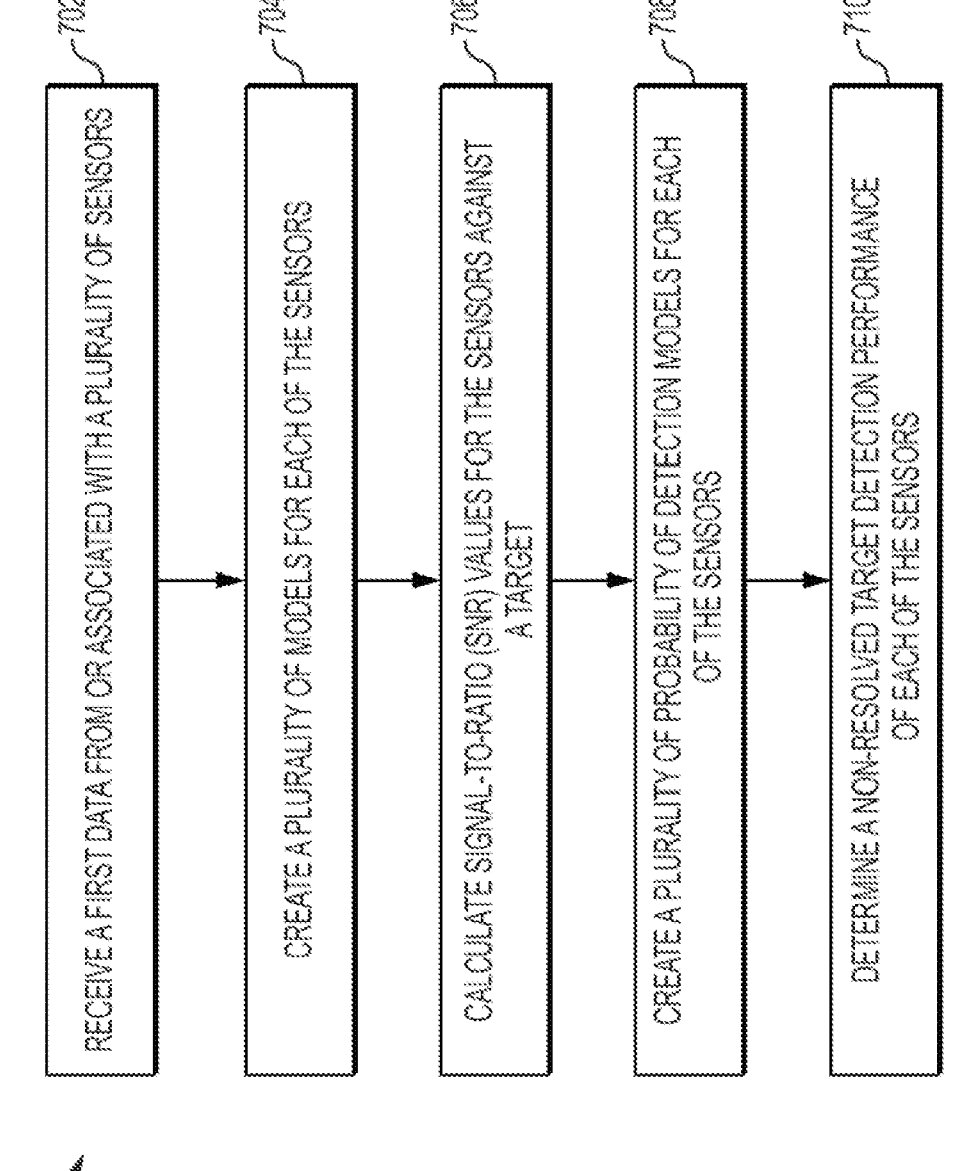
FIG. 7 is a process flowgraph of operations included in an example process for modeling non-resolved object detection performance of sensor systems, in accordance with some embodiments.

FIG. 7 is a process flowgraph of operations included in an example process 700 for modeling a nonresolved object detection performance of a sensor system, in accordance with some embodiments. The operations may be implemented using computer-executable instructions stored on one or more non-transitory machine-readable storage media. The instructions may be executed by one or more processing devices, such as the processor CPU 202 or performance modeler 302, as described in FIG. 2 or FIG. 3, to implement the operations.

Process 700 includes receiving a first data from or associated with a plurality of sensors (Step 702). Process 700 includes creating, using the first data, a plurality of models for each of the sensors (Step 704). The signal-to-noise (SNR) values for the sensors against a target are calculated using the models and the first data (Step 706). Process 700 includes creating, using the SNR values, a plurality of probability of detection (Pd) models for each of the sensors (Step 708). One of the Pd models is for quantum illumination. Furthermore, process 700 includes determining, using the Pd models, non-resolved target detection performance of each sensor.

This disclosure describes a non-resolved object detection and performance system for rapidly modeling the non-resolved object detection performance of sensor systems. The advantages of a non-resolved object detection and performance system and method include modeling sensor performance for determining the object tracking performance of a Kalman filter when assessing the track quality of architecture against a ground-based, air-based, space-based target. The non-resolved object detection and performance system is extremely fast as millions of measurements are required from many different sensor platforms at extremely high measurement rates (up to 100 Hz in some missile tracking cases). Moreover, the non-resolved object detection and performance system includes capabilities to approximate the performance of quantum illumination for quantum RADAR systems.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A system for modeling non-resolved object detection performance of sensor systems, the system comprising one or more computing device processors; and one or more computing device memories, coupled to the one or more computing device processors, the one or more computing device memories storing instructions executed by the one or more computing device processors, wherein the instructions are configured to:

receive a first data from or associated with at least one RADAR sensor, quantum RADAR sensor, or Electro-Optical and Infrared (EOIR) sensor;

create, using the first data, a plurality of detailed illumination models for each of the sensors;

calculate, using the detailed illumination models and the first data, signal-to-ratio (SNR) values for the sensors against a target using a target signal, localized standard deviation of background noise, and a received intensity point on a single frame at a center pixel location;

create, using the SNR values, a plurality of probability of detection models for each of the sensors, wherein at least one of the probability of detection models is a quantum illumination probability of detection model, noise from cloud clutter model that characterizes noise induced from cloud clutter, spatial match filter and velocity matched filtering model that keeps a peak location of a point source unchanged, EOIR atmospheric attenuation that determines a loss of signal propagating through the atmosphere, and a quantum radar sensor model that produces a quantum illumination optimal receiver probability of detection;

determine, using the detection models, non-resolved target detection performance of each of the EOIR sensor; and display, via a user interface, sensor properties and visual performance metrics thereby improving an operator's understanding of an object detected and its surroundings.

2. The system of claim 1, wherein the plurality of models comprises a plurality of illumination models used by RADAR sensors, quantum RADAR sensors, and/or Electro-Optical and Infrared (EOIR) sensors.

3. The system of claim 1, wherein the plurality of models comprises a plurality of models for modeling at least one RADAR sensor.

4. The system of claim 1, wherein the plurality of models comprises a plurality of models for modeling at least one Electro-Optical and Infrared (EOIR) sensor.

5. The system of claim 1, wherein the plurality of detailed illumination models comprises a plurality of models for modeling at least one a quantum RADAR sensor.

6. The system of claim 1, wherein the plurality of detailed illumination models comprises a plurality of models for modeling noise from cloud clutter for both Short Wave Infrared (SWIR) and Medium Wave Infrared (MWIR) wavebands.

7. The system of claim 1, wherein the plurality of models comprises a plurality of models for modeling spatial matched filters and velocity matched filters to improve the SNR values and the non-resolved target detection performance of an Electro-Optical and Infrared (EOIR) sensor.

8. The system of claim 1, wherein plurality of probability of detection models comprises at least one of the following: i) a single pulse probability of detection model for nonfluctuating targets, ii) a probability of detection model for an optimal classic illumination protocol, iii) a probability of detection for the optimal classic illumination protocol, and iv) a multiple pulse probability of detection model for fluctuating targets.

9. A method for modeling non-resolved object detection performance of sensor systems, the method comprising:

receiving a first data from or associated with at least one RADAR sensor, quantum RADAR sensor, or Electro-Optical and Infrared (EOIR) sensor;

creating, using the first data, a plurality of detailed illumination models for each of the sensors;

calculating, using the detailed illumination models and the first data, signal-to-ratio (SNR) values for the sensors against a target using a target signal, localized standard deviation of background noise, and a received intensity point on a single frame at a center pixel location;

creating, using the SNR values, a plurality of probability of detection models for each of the sensors, wherein at least one of the probability of detection models is a quantum illumination probability of detection model, noise from cloud clutter model that characterizes noise induced from cloud clutter, spatial match filter and velocity matched filtering model that keeps a peak location of a point source unchanged, EOIR atmospheric attenuation that determines a loss of signal propagating through the atmosphere, and a quantum radar sensor model that produces a quantum illumination optimal receiver probability of detection;

determining, using the detection models, non-resolved target detection performance of each of the sensors; and displaying, via a user interface, sensor properties and visualize performance metrics thereby improving an operator's understanding of an object detected and its surroundings.

10. The method of claim 9, wherein the plurality of models comprises a plurality of illumination models used by RADAR sensors, quantum RADAR sensors, and/or Electro-Optical and Infrared (EOIR) sensors.

11. The method of claim 9, wherein the plurality of models comprises a plurality of models for modeling at least one RADAR sensor.

12. The method of claim 9, wherein the plurality of models comprises a plurality of models for modeling at least one Electro-Optical and Infrared sensor.

13. The method of claim 9, wherein the plurality of models comprises a plurality of models for modeling at least one a quantum RADAR sensor.

14. The method of claim 9, wherein the plurality of models comprises a plurality of models for modeling noise from cloud clutter for both Short Wave Infrared (SWIR) and Medium Wave Infrared (MWIR) wavebands.

15. The system of claim 9, wherein the plurality of models comprises a plurality of models for modeling spatial matched filters and velocity matched filters to improve the SNR values and the non-resolved target detection performance of an Electro-Optical and Infrared (EOIR) sensor.

16. The method of claim 9, wherein the first data comprises data received by a user from a user interface regarding properties of at least one of the plurality of sensors.

17. The method of claim 9, wherein plurality of probability of detection models comprises at least one of the following: i) a single pulse probability of detection model for nonfluctuating targets, ii) a probability of detection model for the optimal classic illumination protocol, iii) a probability of detection for an optimal classic illumination protocol, and iv) a multiple pulse probability of detection model for fluctuating targets.

18. A non-transitory computer-readable storage medium storing instructions which when executed by a computer cause the computer to perform a method for modeling non-resolved object detection performance of sensor systems, the method comprising:

receiving a first data from or associated with at least one RADAR sensor, quantum RADAR sensor, or Electro-Optical and Infrared (EOIR) sensor;

creating, using the first data, a plurality of detailed illumination models for each of the sensors;

calculating, using the detailed illumination models and the first data, signal-to-ratio (SNR) values for the sensors against a target using a target signal, localized standard deviation of background noise, and a received intensity point on a single frame at a center pixel location;

creating, using the SNR values, a plurality of probability of detection models for each of the sensors, wherein at least one of the probability of detection models is a quantum illumination probability of detection model, noise from cloud clutter model that characterizes noise induced from cloud clutter, spatial match filter and velocity matched filtering model that keeps a peak location of a point source unchanged, EOIR atmospheric attenuation that determines a loss of signal propagating through the atmosphere, and a quantum radar sensor model that produces a quantum illumination optimal receiver probability of detection;

determining, using the detection models, non-resolved target detection performance of each of the sensors; and displaying, via a user interface, sensor properties and visualize performance metrics thereby improving an operator's understanding of an object detected and its surroundings.

* * * * *